Nov. 1, 1927.  1,647,192
H. NYQUIST
APPARATUS FOR CONTROLLING THE FREQUENCY OF AN ALTERNATING CURRENT
Filed Dec. 19, 1923   3 Sheets-Sheet 1

INVENTOR
H. Nyquist
BY
ATTORNEY

Patented Nov. 1, 1927.                                            1,647,192

UNITED STATES PATENT OFFICE.

HARRY NYQUIST, OF JACKSON HEIGHTS, NEW YORK, ASSIGNOR TO AMERICAN TELEPHONE AND TELEGRAPH COMPANY, A CORPORATION OF NEW YORK.

APPARATUS FOR CONTROLLING THE FREQUENCY OF AN ALTERNATING CURRENT.

Application filed December 19, 1923. Serial No. 681,594.

A principal object of my invention is to provide a new and improved method and suitable apparatus for controlling the frequency of an alternating current generator. Other objects of my invention have relation to keeping an alternating current generator in step with a standard controlling frequency, and not only keeping the generator at the same frequency as the controlling frequency but also keeping it in definite normal phase relation therewith. In another aspect, my invention has to do with determining the frequency and the phase of an alternating current generator in accordance with a standard alternating current which may be of low power. These and various other objects of my invention will be made apparent on consideration of a limited number of specific examples, which I have chosen to present by way of illustration. It will be understood that the following specification relates to these examples, leaving the scope of the invention to be indicated in the appended claims.

Figure 1:
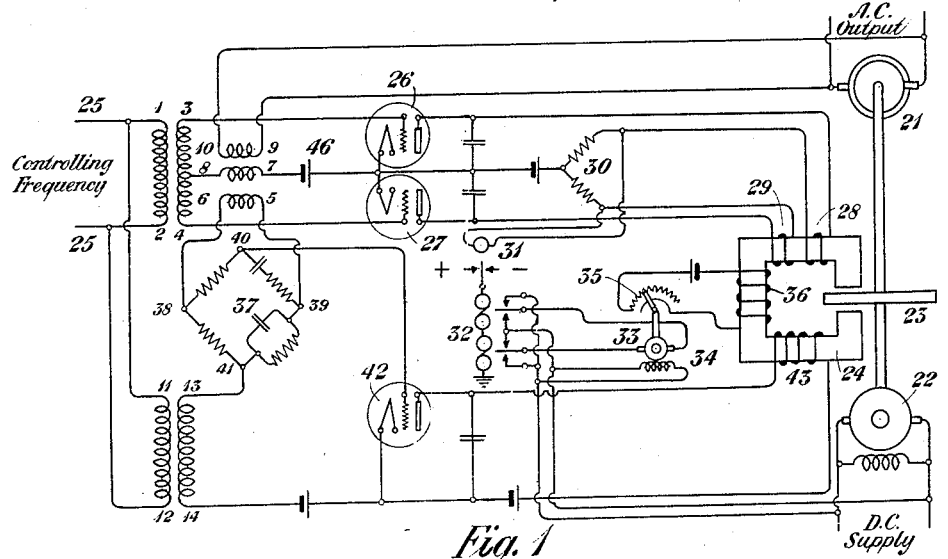
Figure 1A:
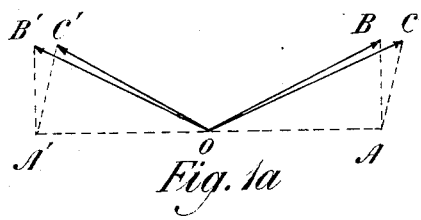
Figure 2:
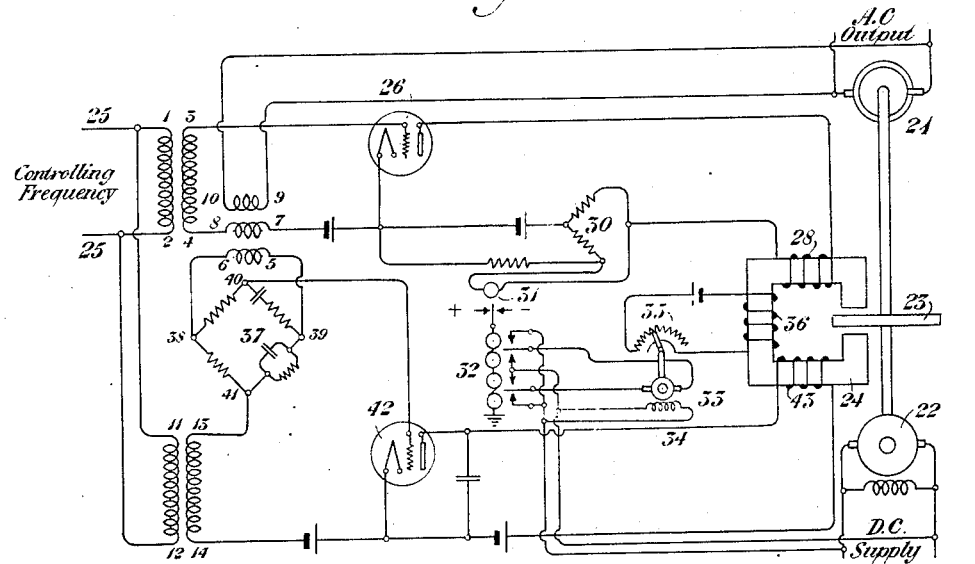
Figure 3:
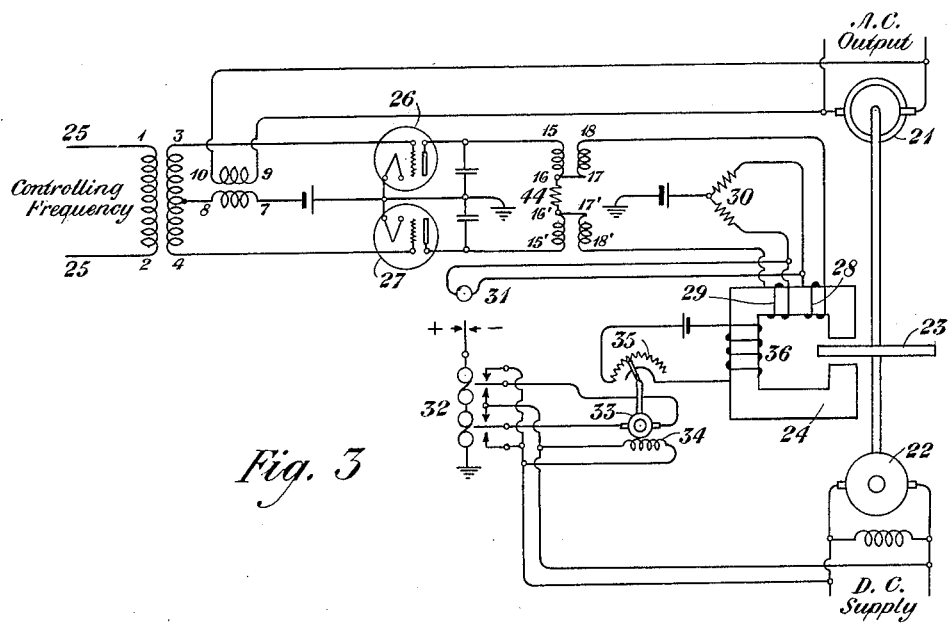
Figure 4:
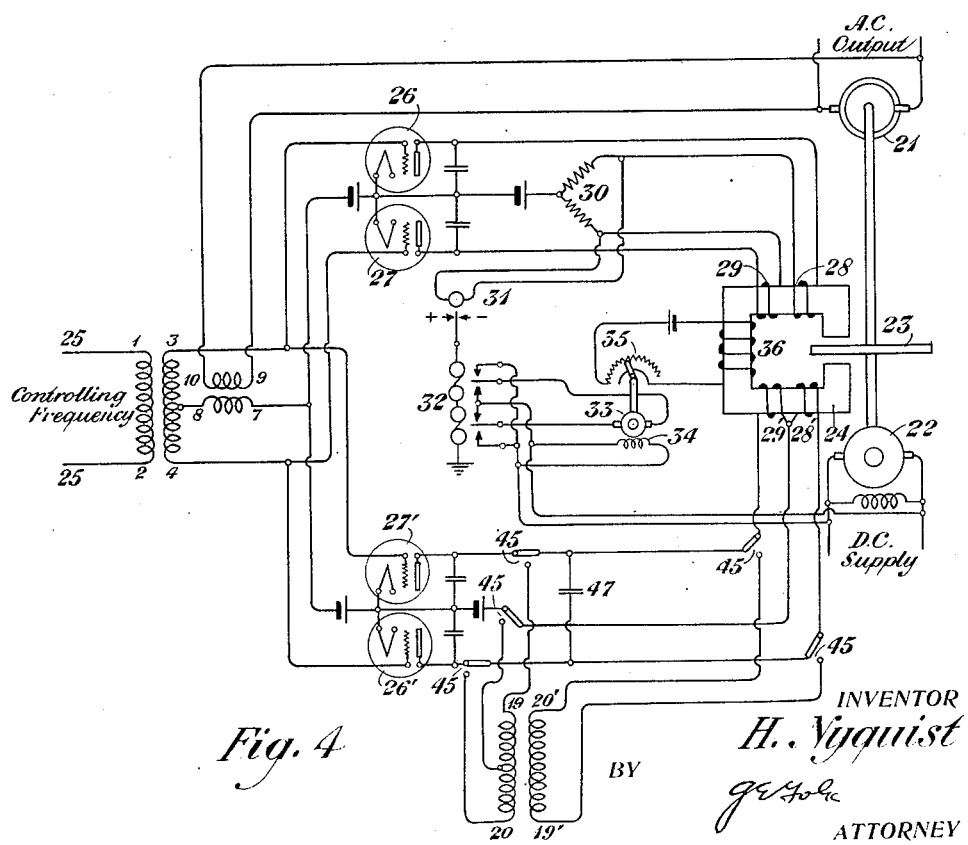
Figure 5:
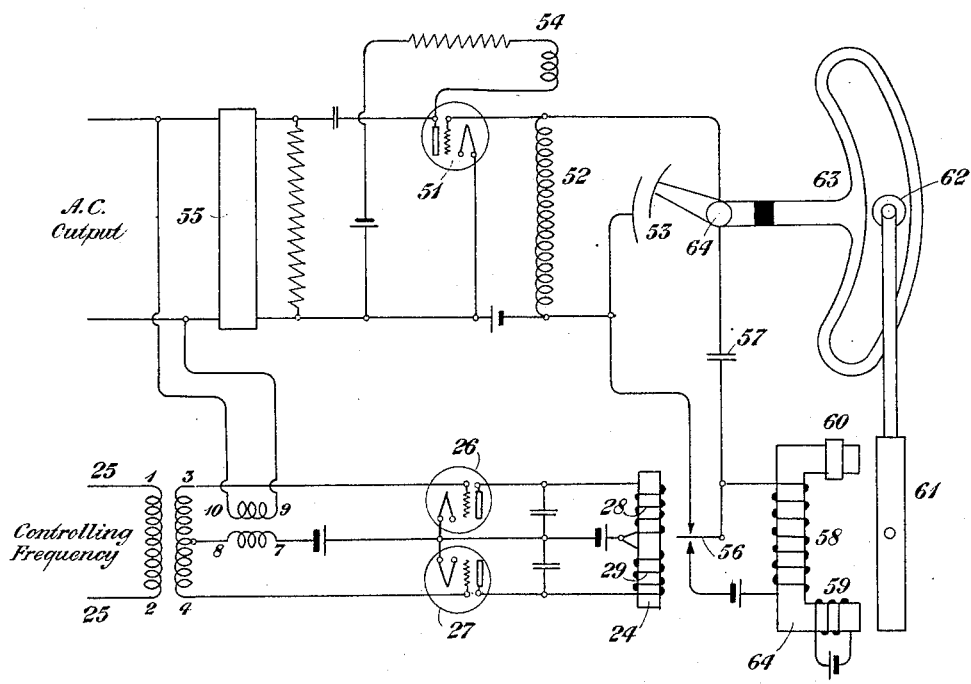

Referring to the drawings, Figure 1 is a diagram of a system embodying the principles of my invention; Fig. 1ª is a vector diagram that will be referred to in explaining the principle of Fig. 1; Fig. 2 is a modification employing a single three-electrode vacuum tube instead of an opposed pair of such tubes as in Fig. 1; Fig. 3 is a modification in which the transformer 15—16—17—18 is employed to prevent "hunting" instead of the Wheatstone bridge 37 of Fig. 1; Fig. 4 is a diagram of a system in which hunting is prevented in another way; and Fig. 5 is a diagram for a system in which a three-electrode vacuum tube oscillator is employed as the alternating current generator.

Referring to Fig. 1, the alternating current generator 21 is driven by the direct current motor 22 on the same shaft, this shaft also carrying a copper disc 23 which rotates between the poles of the electromagnet 24. Adjustment is made so that, if the magnet 24 were removed, the motor 22 would drive the generator 21 a little too fast; the presence of the magnet 24 with a suitable field developed therein puts a brake on the disc 23 and holds the generator 21 down to the proper speed.

The controlling frequency alternating current comes in over the conductors 25 to the primary 1—2 of a transformer. The three-electrode vacuum tubes 26 and 27 have their grid circuits connected with the secondary 3—4 of the same transformer in the manner shown in Fig. 1. (Here and elsewhere throughout this specification, the convention is employed that currents through the windings of a transformer from an odd number to an even number will magnetize the common core alike.) The common grid circuit battery 46 is strongly negative so as to make detectors of the tubes 26 and 27. Their respective output circuits comprise the resistances 30 and the windings 28 and 29 of the magnet 24.

The adjustment of the rheostat 35 will be described presently. Assume for the present that it is so adjusted that the battery in circuit therewith puts a current through the winding 36 that puts very nearly the proper braking effect on the disc 23.

The output electromotive force is applied in the grid circuits through the transformer whose primary is 9—10 and whose secondary is 7—8. Normally the two superposed electromotive forces on the grids due to the controlling frequency and the output frequency will be 90 degrees apart. It is evident that one of these electromotive forces acts oppositely in the two grid circuits and the other acts in the same direction in the two circuits. Referring to the vector diagram in Fig. 1ª, the controlling frequency electromotive force on the grid of the tube 26 is represented by OA and the generator output electromotive force by AB, so that the resultant electromotive force on the grid is represented by OB. On the grid of the tube 27, the controlling frequency electromotive force is represented by OA′, the generator output electromotive force by A′B′, and the resultant on the grid by OB′. As long as the two electromotive forces are 90 degrees apart, the vectors OB and OB′ will remain of equal magnitude, the output currents in the coils 28 and 29 will be equal and their combined effect to magnetize the core 24 will be nil.

But suppose that there is a departure from the 90-degree relation between the controlling frequency electromotive force and the output alternating current electromotive force applied to the grids of the tubes 26 and 27. In magnitude the component OA will still equal the component OA′ and the component AC will still equal the component A'C'. But the magnitudes of the resultants OC and OC' will be widely different, as shown in Fig. 1ª. Accordingly, one coil, 28 or 29, will carry a larger output current from the corresponding tube 26 or 27, and the field of the magnet 24 will be increased or decreased so as to apply the proper correction to the braking effect on the disc 23.

To guard against "hunting", the Wheatstone bridge 37 is provided with its arms composed of resistances and capacities as shown in Fig. 1. The output alternating current in the primary 9—10 is applied through the secondary 5—6 across the vertices 38—39 of the bridge 37. The three-electrode vacuum tube 42 is provided and its grid circuit takes the unbalance electromotive force across the vertices 40 and 41 of the bridge 37 superposed on the electromotive force of the controlling frequency which is applied through the transformer whose primary is 11—12 and whose secondary is 13—14.

The Wheatstone bridge 37 is so balanced that, at the normal frequency, there is no current transmitted through it. Now, if the impressed frequency be changed, the balance is no longer perfect but there is a resulting electromotive force between terminals 40 and 41 which is 90 degrees out of phase with the impressed voltage. Moreover, the voltage between terminals 40 and 41 is in the opposite direction when the frequency is slightly too high from what it is when the frequency is slightly too low. This residual voltage is superimposed on the constant voltage which exists between terminals 13 and 14, and the total resulting voltage is impressed on the grid of the tube 42. It will be seen that when the frequency is normal, there is a constant voltage impressed on the grid of the tube 42 which equals the voltage between terminals 13 and 14 and, therefore, there is a constant direct current through winding 43. Now, if there is a relative displacement of the phase of the two currents (the controlling current in circuit 25 and the generated current from generator 21), this may give rise to hunting. In order to do this, the phase displacement must be accompanied by a temporary change of frequency of the generated current. It will be apparent that the network 37, taken in connection with its associated apparatus, functions on the frequency change under consideration to change the braking effect of electromagnet 24. When the connection is as shown in the figure, this change of the braking force is an increase if the frequency is too high, and a decrease if it is too low. Consequently, the effect is to stabilize the system and to decrease the tendency to hunting.

Thus the current in the winding 43 will be timed to apply a superposed braking effect on the disc 23, 90 degrees behind the hunting displacement of the disc 23. This superposed braking force will be in just the proper phase to oppose the hunting and the tendency to hunt will be effectively prevented.

At the outset it was assumed that under normal conditions the currents in the two coils 28 and 29 would be equal and opposite in their effect on the core 24. In order that this may be substantially true, the apparatus is provided which is shown associated with the coil 36 and the rheostat 35. Should the current become greater in either winding 28 or 29, a net effective difference of electromotive force would be established through the relay 31 across the resistances 30. Accordingly, the circuit of the polarized relays 32 would be closed on a positive or a negative source, respectively, for the two cases, according to whether the current was greater in the winding 28 or 29. The field winding 34 for the motor armature 33 is always closed one way on the direct current supply. When the polar relays 32 are operated, they will close the circuit of the armature 33 one way or the other according to the direction in which the polar relays 32 are operated. The energization of the motor armature 33 will cause the rheostat 35 to change its adjustment and the flux induced by the winding 36 will be increased or decreased until the magnetomotive forces due to the windings 28 and 29 are brought back to equality.

The system of Fig. 2 differs from that of Fig. 1 principally in the modifications to enable the employment of a single tube 26 instead of the pair of tubes 26 and 27 of Fig. 1. Under normal conditions, the vector diagram OAB of Fig. 1ª may be taken to represent the electromotive forces in the grid circuit of the tube 26 of Fig. 2. The two electromotive forces, one of the controlling frequency and the other of the output frequency, will be 90 degrees apart. When the phase relation changes, even though the magnitudes of the two electromotive forces remain the same as before, the magnitude of their resultant changes as from OB to OC. This puts a changed braking force on the disc 23 through the increase or decrease of current in the winding 28 and this change in the braking force on the disc 23 has a tendency to correct the departure from the 90-degree phase relation.

The same system to check hunting and to make a slow adjustment to preserve the normal 90-degree phase relation is shown in Fig. 2 as in Fig. 1.

Fig. 3 differs essentially from Fig. 1 in the modification introduced in the output circuits of the three-electrode vacuum tubes 26 and 27. This modification takes the place of the Wheatstone bridge 37 and associated elements in Fig. 1 to prevent hunting. The added apparatus consists of the two transformers 15—16—17—18 and 15'—16'—17'—18' and the resistance 44.

Under normal conditions there will be equal steady currents through the two coils 28 and 29, and the two transformers 15—16—17—18 and 15'—16'—17'—18' will act like choke coils; there will also be current in the resistance 44. When the frequencies of control and generator differ, such frequency difference brings about departure from the 90-degree relation, and the output of one tube will increase and that of the other decrease. This change will produce voltages in windings 17—18 and 17'—18' which are proportional to the rate of change in the primaries. Hence the electromotive forces in windings 28 and 29 are proportional to the rate with which the two phases are being displaced. With the poling shown in Fig. 3, the braking force due to this component is such as to oppose the displacement which produces it and consequently, the tendency to hunting is reduced.

In Fig. 4, two pairs of three-electrode vacuum tubes are employed, 26 and 27 in one pair and 26' and 27' in the other pair. The condenser 47 is placed across the plate circuits for the tubes 26' and 27' as shown in Fig. 4, and hence for any change in the magnitude of the currents in the windings 28, 29, 28' or 29', there will be a lag in the windings 28' and 29'. This induces a lagging force in relation to the hunting frequency that tends to check hunting in the disc 23. By throwing the five switches 45, the condenser 47 is omitted and a transformer of low mutual inductance is interposed, as indicated by the numerals 19—20, 19'—20'. This introduces a similar lag with respect to the hunting frequency in the windings 28' and 29' and, therefore, develops a tendency to check hunting.

In the system shown in Fig. 5, a three-electrode vacuum tube oscillator is employed as the generator. The oscillator tube is shown at 51 with an oscillating circuit connected to its grid comprising the inductance 52 and the variable condenser 53 in parallel. The output or plate circuit comprises a coil 54 in inductive relationship to the coil 52, so as to sustain the oscillatory current in the circuit 52, 53. The output electromotive force is applied to the amplifier 55, from which the alternating current output is obtained.

The controlling electromotive force of given frequency coming in over the conductors 25 is combined with the output electromotive force on the grid circuits of the vacuum tubes 26 and 27, the same as for Fig. 1. Under normal conditions, the two electromotive forces superposed in the grid circuits will be 90 degrees apart, so that the diagram of Fig. 1ª will apply, and hence the electromotive forces on the two grids of the tubes 26 and 27 will be of equal magnitude, and since the two tubes have a grid battery adjustment that makes detectors of them, the output currents in the relay windings 28 and 29 will be equal and the relay armature 56 will stand open at neutral.

But if the phase relation of the controlling alternating electromotive force and the output electromotive force departs from 90 degrees, then in the same way as explained for Fig. 1, the currents in the windings 28 and 29 will become unequal and the armature 56 will go to one or the other of its adjacent contacts.

Normally the capacity of the adjustable condenser 53 will be slightly less than that necessary to establish a natural frequency of oscillation in the circuit 52—53 equal to the controlling frequency in the conductors 25. The addition of the condenser 57 in parallel with the condenser 53 makes their united capacity slightly greater than that for an oscillation frequency equal to the controlling frequency. Hence in normal operation, the relay armature 56 will vibrate successively, alternately putting the condenser 57 in parallel with the condenser 53 and then opening the shunt containing it.

The armature 56 also controls the circuit of a battery and a coil 58 on the core 64. This core carries a slow band 60 so that it is slow acting. The winding 58, when closed, magnetizes the core 64 oppositely and in excess of the permanently closed winding 59. When the armature 56 spends about as much time on one contact as on the other, the integral current through the winding 58 produces about the same integral magnetomotive force as the winding 59 and the armature 61 stands at neutral. But when the armature 56 spends a little more or a little less than half its time on the lower contact, the net integral magnetization of the core 64 will be effective one way or the other to throw the armature 61.

The friction wheel 62 rotates continuously and is carried on the end of the arm supported by the armature 61. When the armature 61 moves one way, the wheel 62 engages the sector 63 to increase the capacity of the condenser 53; when the armature 61 moves the other way, the capacity of the condenser 53 is decreased.

It will be seen that the parts associated with the armature 61 and the sector 63 provide for a slow adjustment and that the parts associated with the condenser 57 provide a quick adjustment to keep the proper phase relation between the controlling electromotive force and the output current.

The device of Fig. 5 is free from hunting because the adjustment of the condenser 53 does not involve a restoring force varying in proportion to the hunting displacement as is the case with the restoring force applied to the disc 23 in Fig. 1 through the windings 28 and 29.

I claim:

1. Means to generate an alternating current of frequency and phase determined by a controlling alternating current in a given circuit, comprising a generator, a three-electrode vacuum tube, means to superpose the controlling electromotive force and the generator output electromotive force in the grid circuit of said tube, and means operated by the output current of the tube to govern the frequency of the generator according to the phase relation of the two frequencies.

2. Means to generate an alternating current of frequency and phase determined by a controlling alternating current in a given circuit, comprising a generator, two three-electrode vacuum tubes, means to superpose the controlling electromotive force and the generator output electromotive force in the grid circuits of said tubes, one of them in the same phase in both grid circuits, the other in opposite phase in both grid circuits, and means operated by the differential output current of the tubes to govern the frequency of the generator.

3. Means to generate an alternating current of frequency and phase determined by a controlling alternating current in a given circuit, comprising a generator, a three-electrode vacuum tube detector, means to superpose the controlling electromotive force and the generator output electromotive force in the grid circuit of said detector, and means operated by the output current from the detector to govern the frequency of the generator according as the output current is varied by variation in the phase relation of the input electromotive forces.

4. Means to govern the speed of an alternating current generator comprising a three-electrode vacuum tube, means to apply the generator frequency electromotive force in the grid circuit thereof, means to superpose an electromotive force of a standard frequency, and means to vary the generator frequency in accordance with the phase displacement of the two electromotive forces in the grid circuit.

5. In a system for controlling the frequency of an alternating current generator in accordance with the frequency of a standard source of alternating current, a circuit, means to superpose therein the standard electromotive force and the generator electromotive force, and means to alter the speed of the generator in accordance with the phase displacement from a normal relation between the two electromotive forces in the said circuit.

6. In a system for controlling the frequency of an alternating current generator in accordance with the frequency of a standard source of alternating current, a three-electrode vacuum tube detector, an input circuit for said detector, means to superpose in said input circuit the generator electromotive force and the standard electromotive force, and means to govern the frequency of the generator by the current in the output circuit of the said detector.

7. In a system for controlling the frequency of an alternating current generator in accordance with the frequency of a standard source of alternating current, means to combine the effects of the currents from said generator and said source in approximate quadrature, and means to regulate the speed of the said generator by the change of magnitude of the resultant due to departure from the quadrature relation.

8. In a system for governing the speed of an alternating current generator by means of a standard source of alternating current, means to add the electromotive forces of the two currents vectorially in approximate quadrature relation, and means to govern the speed of the said generator by the change of magnitude of the resultant due to departure from that relation.

In testimony whereof, I have signed my name to this specification this 18th day of December, 1923.

HARRY NYQUIST.